(12) United States Patent
Bailey

(10) Patent No.: US 7,096,742 B2
(45) Date of Patent: Aug. 29, 2006

(54) LOAD SUPPORT ASSEMBLY AND METHOD OF USING SAME

(75) Inventor: Michael Antony Bailey, Berkshire (GB)

(73) Assignee: Thames Side—Maywood Limited, (GB)

( * ) Notice: Subject to any disclaimer, the term of this patent is extended or adjusted under 35 U.S.C. 154(b) by 0 days.

(21) Appl. No.: 10/618,435

(22) Filed: Jul. 10, 2003

(65) Prior Publication Data
US 2004/0144185 A1 Jul. 29, 2004

(30) Foreign Application Priority Data
Jul. 12, 2002 (GB) ................. 0216175.0

(51) Int. Cl.
*G01B 7/16* (2006.01)
(52) U.S. Cl. ....................................... 73/774
(58) Field of Classification Search ............... 73/774, 73/781, 788, 826, 862.392, 862.393, 862.56
See application file for complete search history.

(56) References Cited

U.S. PATENT DOCUMENTS

| | | | | |
|---|---|---|---|---|
| 3,646,512 A * | 2/1972 | Borgstede | .................... | 340/440 |
| 3,908,772 A | 9/1975 | Bohlin et al. | .................. | 177/17 |
| 4,533,009 A * | 8/1985 | Evans | ........................ | 177/139 |
| 4,862,740 A * | 9/1989 | Lanier | ....................... | 73/150 A |
| 5,273,333 A * | 12/1993 | Hatfield et al. | ............. | 294/82.3 |
| 5,369,222 A | 11/1994 | Strelioff | ...................... | 177/136 |
| 5,591,943 A | 1/1997 | Cheng | ......................... | 177/147 |
| 5,593,113 A * | 1/1997 | Cox | .......................... | 244/137.1 |
| 5,744,955 A * | 4/1998 | Booker | ....................... | 324/240 |
| 5,745,042 A | 4/1998 | Pratt | ........................... | 340/657 |
| 6,345,799 B1 * | 2/2002 | Fusi | ........................... | 248/320 |

FOREIGN PATENT DOCUMENTS

| | | |
|---|---|---|
| EP | 0 952 436 | 10/1999 |
| GB | 1 487 396 | 7/1974 |
| GB | 2 208 940 | 4/1989 |

* cited by examiner

*Primary Examiner*—Max Noori
(74) *Attorney, Agent, or Firm*—Christensen O'Connor Johnson Kindness PLLC

(57) ABSTRACT

An assembly for use in suspending loads from a load cell comprising: an upper part adapted to be secured to an anchor point and from which a load cell may be suspended; and a lower part adapted to be suspended from the load cell and from which a load may be suspended, in which, in use, the assembly may be used in at least two positions, including: an inoperative position in which the load cell is not fitted, where the lower part and hence the load is supported on the upper part, and an operative position in which the lower part and the load are supported only through the load cell and the lower part does not rest on the upper part. Also, an assembly for use in supporting loads on a load cell, comprising: a lower part adapted to support a load cell; and an upper part adapted to be supported by the load cell and on which a load can be supported, in which, in use, the assembly may be used in at least two positions, including: an inoperative position in which the load cell is not fitted, where the upper part, and hence the load, is supported on the lower part; and an operative position in which the upper part and the load are supported only through the load cell and the upper part does not rest on the lower part, and in which the assembly includes lifting means comprising an upper engagement member, by means of which the upper part is adapted engage the load cell and which allows controlled movement of the upper part relative to the load cell.

23 Claims, 7 Drawing Sheets

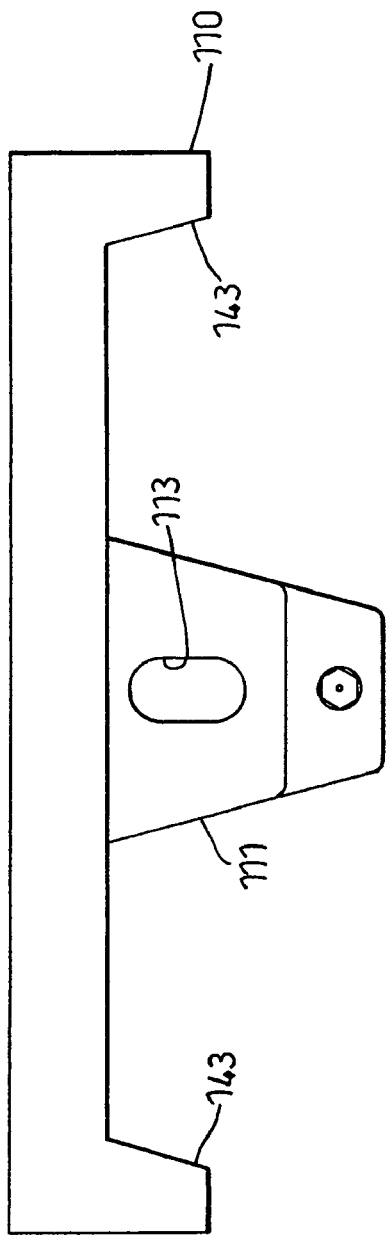
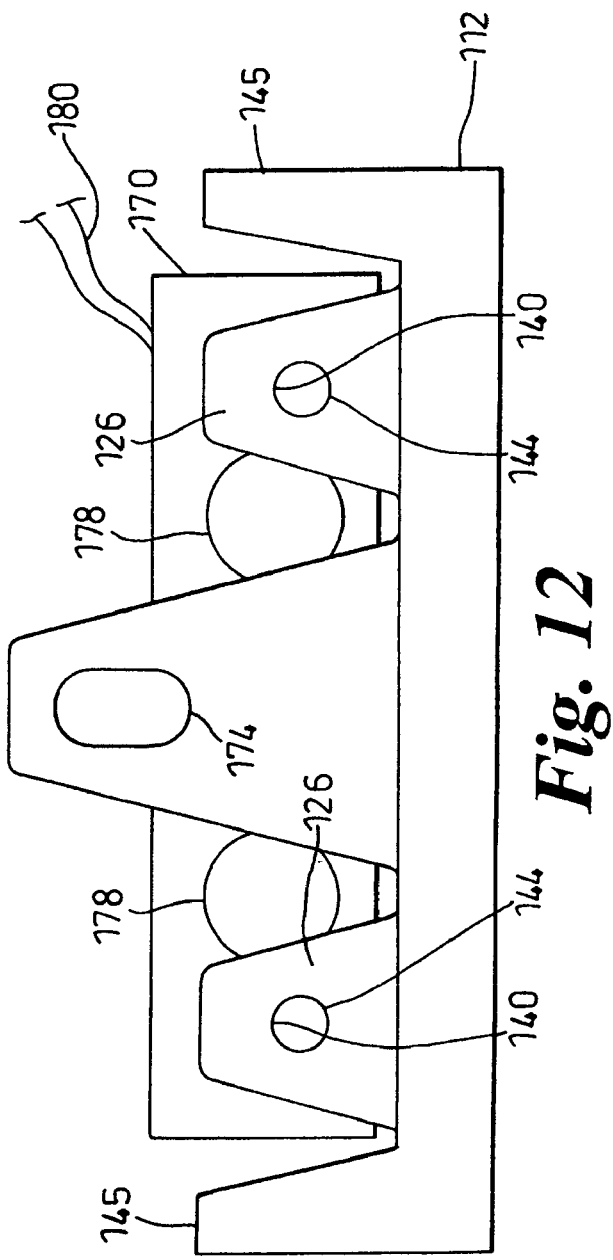

LOAD SUPPORT ASSEMBLY AND METHOD OF USING SAME

This invention relates to load assemblies such as may be, although non-exclusively, used to support load cells used to measure loads in tension or compression and for methods of measuring forces using a load cell.

Load cells are commonly of the form of a beam on which a load can be applied which is shaped such that a region of the beam deforms in a known manner. Strain gauges which exhibit a known change in resistance for a given deformation, can be applied to the region. Therefore, measurement of the resistance of the strain gauges gives an indication of the load on the load cell.

One commonly used load cell, the "S-beam" load-cell, is of the form of an S-shaped beam, with a thinned out section or sections at or near the centre of the S. The strain gauges are mounted on these thinned out sections. Such a load cell is generally supported by the top of the S and a load applied at the bottom.

Another commonly known load cell, the "shear beam" load cell, is of the form of a beam, with a thinned out section or sections along its length. Strain gauges are mounted on these thinned out sections. Such a load cell is generally supported either by one end, with the load applied to the other end or the load cell, or by both ends, with the load applied to the centre of the load cell.

It is known in the art to measure the force exerted by a load by suspending the load from a load cell, typically an S-beam load cell, suspended from an anchor point and measuring the known changes in resistance of strain gauges.

Similarly, it is known to measure the force exerted by a load by applying the load to a load cell, such as a shear beam load cell supported by one or both ends, and measuring the resulting changes in the resistance of the strain gauges.

However, these embodiments have the disadvantage that, should it prove necessary to remove the load cell, for example in case of a fault in the load cell, then, as the load cell provides the support for the load, the load must be removed from the load cell and otherwise supported. Furthermore, if the load cell snaps or otherwise breaks the load may fall uncontrollably so in most situations a safety strap or support must be provided in parallel with the load cell. Unfortunately, such straps or supports have a tendency to exert a force or support the load to some extent, which reduces the accuracy of such measurements.

According to a first aspect of the invention, there is provided an assembly for use in suspending loads from a load cell, comprising:
   an upper part adapted to be secured to an anchor point and from which a load cell may be suspended; and
   a lower part adapted to be suspended from the load cell and from which a load may be suspended, in which, in use, the assembly may be used in at least two positions, including:
   an inoperative position in which the load cell is not fitted, where the lower part and hence the load is supported on the upper part;

and
   an operative position in which the lower part and the load are supported only through the load cell and the lower part does not rest on the upper part.

Advantageously, this provides a load assembly that can support a load in the inoperative position but allows the load cell to take the load in the second, operative, position. Accordingly, the load cell may be removed in the inoperative position and replaced or otherwise maintained as necessary. The load cell with which the assembly is adapted to be used with may be S-beam load cell.

The assembly may conveniently include means adapted to switch the assembly between inoperative and operative positions. This may be lifting means, which is adapted to lift the lower part off the upper part. Preferably, the lifting means is adapted to lift the lower part by lifting the load cell.

The lifting means may comprise an upper engagement members, by means of which the upper part is adapted to engage the load cell, and a lower engagement member by means of which the lower part is adapted to engage the load cell. The lower engagement member may fix the lower part vertically relative to the load cell, whilst the upper engagement member may allow controlled movement of the load cell relative to the upper part. Such movement may have a vertical component, and may indeed be entirely vertical. Accordingly, at least a portion of the upper engagement member may move vertically relative to the upper part.

In a preferred embodiment, the upper engagement member may be adapted to rotate about an axis. It may have a portion offset from this axis. The upper engagement member may be adapted to engage the load cell at this offset portion. Specifically, the upper engagement member may comprise a cranked shaft.

The upper part may be provided with a series of holes through which the upper engagement member may removably pass. The upper engagement member may be removable and re-insertable from the upper part by sliding along the length of the shaft through the holes. The holes that the offset portion pass in order to remove the upper engagement member may be elongate in order to allow easy removal and re-insertion of the upper engagement member.

At least one of the holes may be in at least one, but preferably two, forks depending from the upper part into the interior thereof. These forks may provide part of the connection between the load cell and the upper part.

The assembly may be adapted to engage the load cell using the offset portion of the upper engagement member. Accordingly, rotation of the upper engagement member may cause the load cell to lift and hence the lower part no longer rests on the upper part. This provides means for switching between the inoperative and operative positions.

The upper engagement member may further comprise a handle, by means of which rotation of the shaft is facilitated. The handle may be connected perpendicularly to the first shaft, possibly at an end thereof. A handle, especially if it extends away from the axis of the shaft further than the offset portion, enables the load to be lifted into the operative position by a user.

The handle may be securable to the upper part such that, in use, the upper engagement member cannot rotate. The handle may be, in the operative position, securable to the upper part. The secural of the handle to the upper part may be achieved by means of a screw passing through a hole in the handle and being received in a captive not in the upper part.

The lower part may be provided with at least one, but preferably two, forks depending therefrom, which may engage the lower engagement member. The lower engagement member may comprise a further shaft introduced through the, or each, of the forks of the lower part.

The assembly may be positionable in a further "transit", position in which the lower part is secured to the upper part. The further shaft may secure the upper part to the lower part. In the transit position, the further shaft may pass through at least one of the, or each, fork and through a secural hole in the upper part. Furthermore, in the transit position, the upper engagement member may be secured to the upper part. Accordingly, in the transit position the parts of the assembly are protected against movement relative to one another.

The upper part may include a captive nut by means of which the upper part is secured to the anchor point. The lower part may include a captive nut by means of which it is adapted to be connected to the load.

The upper part may be of the form of a frame surrounding an interior space, with an orifice providing communication between interior and exterior. The lower part may, in the inoperative position, rest on inner walls of the upper part in the region of the orifice. Preferably, the assembly is arranged so that the lower part cannot fall through the orifice. This means that should part of the assembly or the load cell fail, the load will still be supported.

According to a second aspect of the invention, there is provided a combination of an assembly for use in suspending loads from a load cell and a load cell, comprising:
 a load cell;
 an upper part adapted to be secured to an anchor point and from which a load cell may be suspended; and
 a lower part adapted to be suspended from the load cell and from which a load may be suspended,
in which the combination can be used in at least two positions, including:
 an inoperative position in which the lower part and hence the load is supported on the upper part
and
 an operative position in which the lower part and the load are supported only through the load cell and the lower part does not rest on the upper part, and in which the combination further comprises an upper engagement member, by means of which the upper part is adapted to engage the load cell and allow controlled movement of the load cell between the operative and inoperative positions, and a lower engagement member by means of which the lower part is adapted to engage the load cell and fix the lower part vertically relative to the load cell.

The load cell may be an S-beam load cell. Preferably, the load cell is adapted to pivot about its connection to the upper part, which may be the offset portion of the upper engagement member. The surface of the upper part upon which the lower part, in the inoperative position, rests may substantially define a section of the surface of a sphere with a centre at the point about which the load cell is adapted to pivot.

The load cell may comprise one or more loading adaptors by means of which the load cell engages the engagement members. Each loading adaptor may be fixed to an end of the load cell and may define an aperture. The aperture may have bevelled sides such that the loading adaptor may pivot about all three axes relative to any member introduced into the aperture.

The combination may further have any of the features described above in relation to the assembly of the first aspect of the invention.

According to a third aspect of the invention, there is provided a method of measuring the force due to a load, comprising:
 a) suspending the load from an assembly;
 b) fitting the assembly with a load cell; and
 c) causing the assembly to transfer the load such that it is being supported by the load cell.
The assembly may be the assembly of the first aspect of the invention.

The step of causing the assembly to transfer the load to the load cell may comprise lifting a body associated with the load cell at least partially off a rest. The body may lift completely off the rest. The rest may, when the body is resting thereon, support the load.

Lifting may be achieved by means of rotation of a cranked shaft. The cranked shaft may, in use of the assembly, be secured against unwanted rotation.

The method may further comprise the step of allowing the body to fall back onto the rest should part of the assembly fail. Further, the method may include the step of lowering the body back onto the rest such that the load cell may be removed.

We have appreciated that the invention is equally applicable to "compression" load cell assemblies.

According to a fourth aspect of the invention, there is provided an assembly for use in supporting loads on a load cell, comprising:
 a lower part adapted to support a load cell; and
 an upper part adapted to be supported by the load cell and on which a load can be supported, in which, in use, the assembly may be used in at least two positions, including:
 an inoperative position in which the load cell is not fitted, where the upper part, and hence the load, is supported on the lower part; and
 an operative position in which the upper part and the load are supported only through the load cell and the upper part does not rest on the lower part, and in which the assembly includes lifting means comprising an upper engagement member, by means of which the upper part is adapted engage the load cell and which allows controlled movement of the upper part relative to the load cell.

Movement of the upper part relative to the load cell allows the load to be supported, which allows removal of the load cell. The movement is preferably at least partially vertical, and the upper engagement member may be adapted to raise the upper part relative to the load cell from the operative position to a raised position.

The assembly may include fixing means, which are adapted to fix the upper and lower parts together and hence support the upper part on the lower part. They may be adapted to be introduced in the raised position of the upper part, upon which the upper engagement member may lower the upper part onto the fixing means. The fixing means may be chocks, sized to fit within a gap between the upper and lower parts in the raised position.

In a preferred embodiment, the upper engagement member is adapted to rotate about an axis. It may have at least one portion offset from this axis. The upper engagement member may be adapted to engage the load cell at this offset portion. The upper engagement member may engage the upper part such that rotation of the upper engagement member about the axis of rotation causes the upper part to move relative to the load cell. Specifically, the upper engagement member may comprise a cranked shaft, and the upper part may be provided with lugs by means of which the upper part engages the upper engagement member at uncranked portions thereof.

The upper engagement member may further comprise a handle, by means of which rotation of the shaft is facilitated. A handle makes lifting the load to be lifted into the operative position by a user much easier. The handle may be securable to the upper part such that, in use, the upper engagement member cannot rotate. The handle may be, in the operative position, securable to the upper part. The secural of the handle to the upper part may be achieved by means of a screw passing through a hole in the handle and being received in a captive nut in the upper part.

According to a fifth aspect of the invention, there is provided a combination of an assembly for use in supporting loads on a load cell, comprising an assembly according to the fourth aspect of the invention and a load cell.

The load cell may be a shear beam load cell. The load cell may engage the upper engagement member about a groove in the load cell.

The combination may have any of the optional features of the fourth aspect of the invention.

According to a sixth aspect of the invention, there is provided a method of removing a load cell from a load assembly according to the fourth aspect of the invention, comprising causing the upper engagement member to move the upper part, supporting the upper part and removing the load cell.

According to a seventh aspect of the invention, there is provided an assembly for use in supporting a load with a load cell, comprising a support for the load cell, a support for the load, and an engagement means adapted to move a first one of the supports relative to the load cell and which is adapted to provide the engagement between the first support and the load cell.

The engagement means may be a cranked bar, rotation of which is adapted to cause the relative movement of the first support and the load cell.

According to a eighth aspect of the invention, there is provided a combination of the assembly of the seventh aspect of the invention and a load cell.

The invention will now be described by way of example, with reference to the accompanying drawings, in which.

Figure 5:
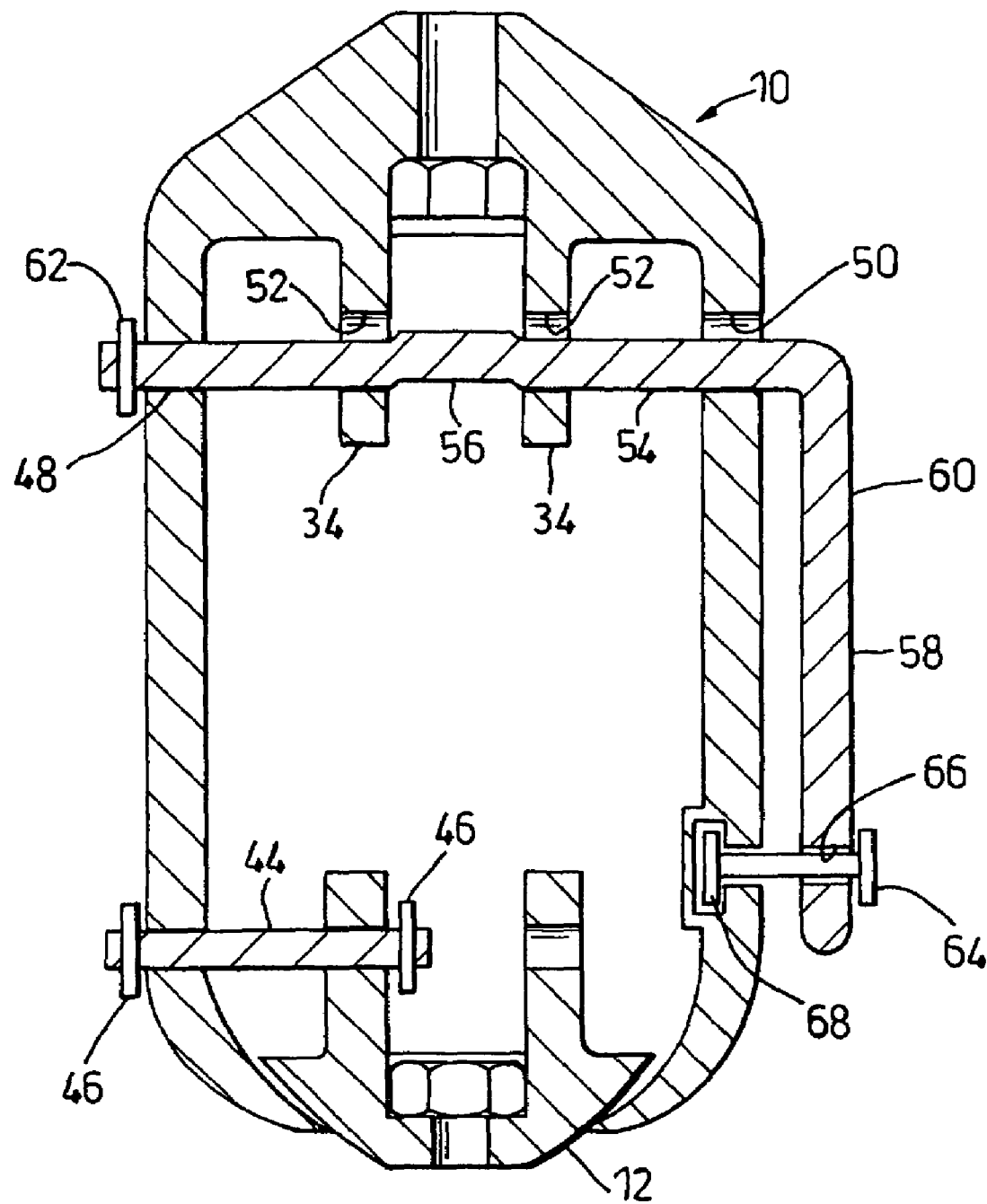
Figure 7:
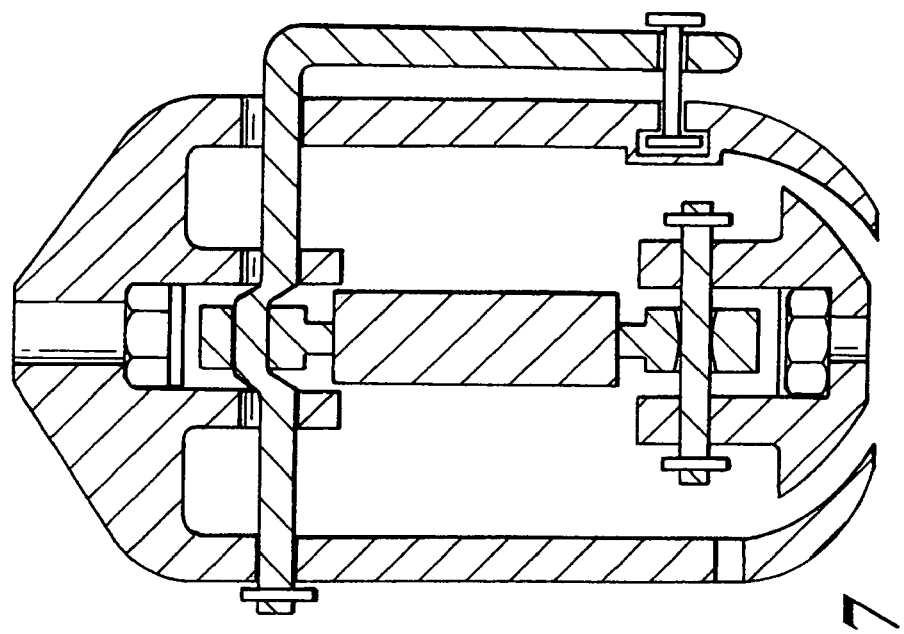
Figure 6:
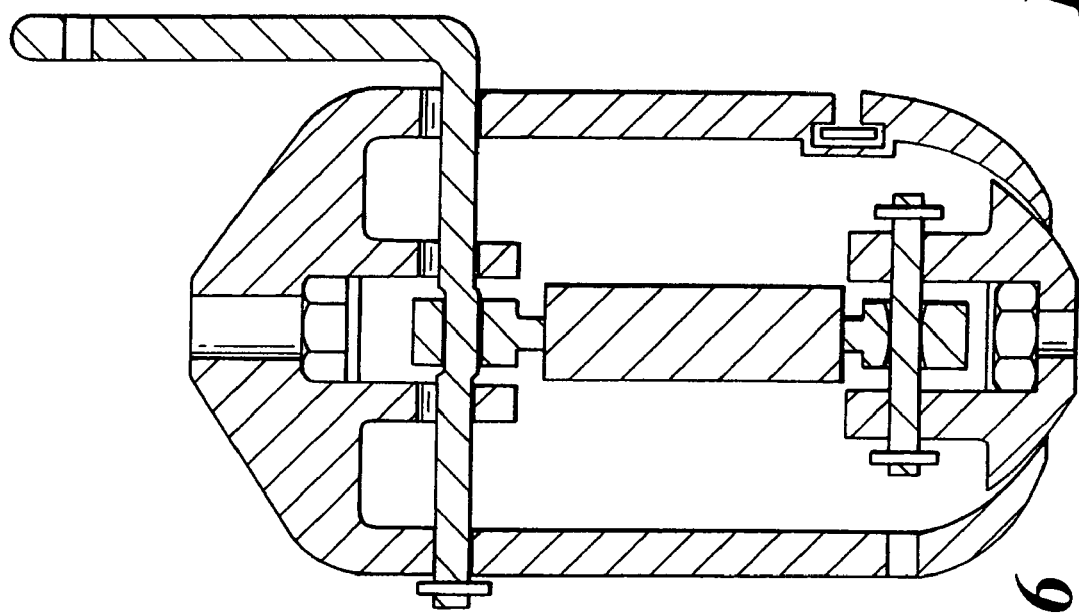
Figure 8:
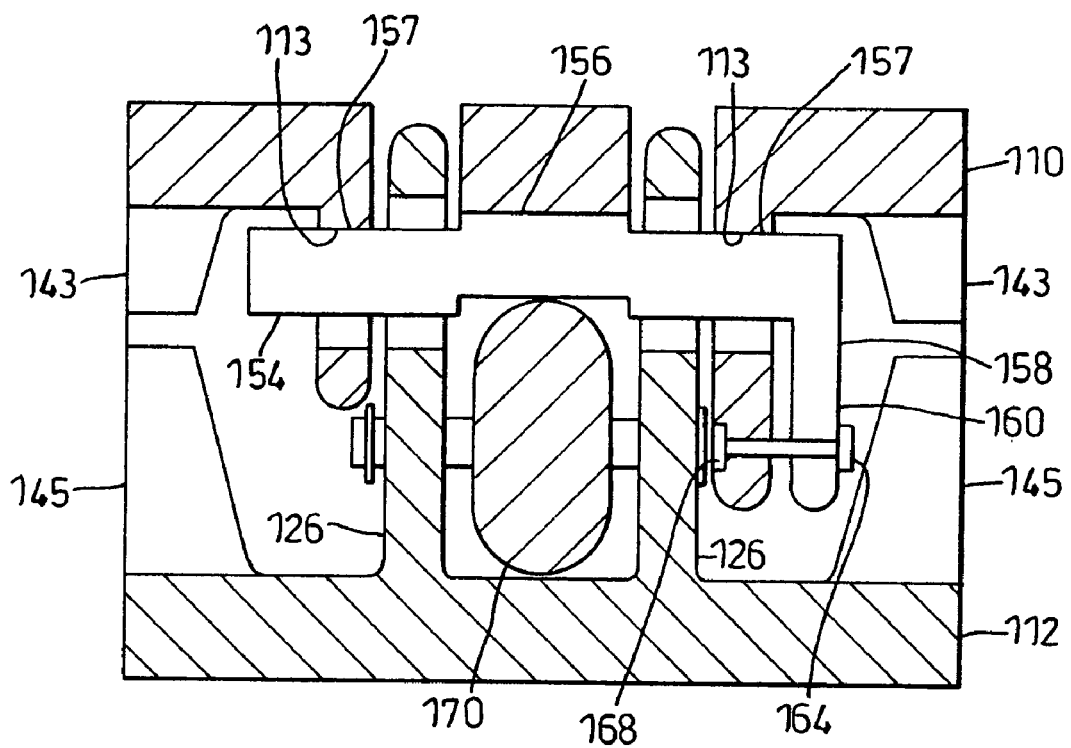
Figure 9:
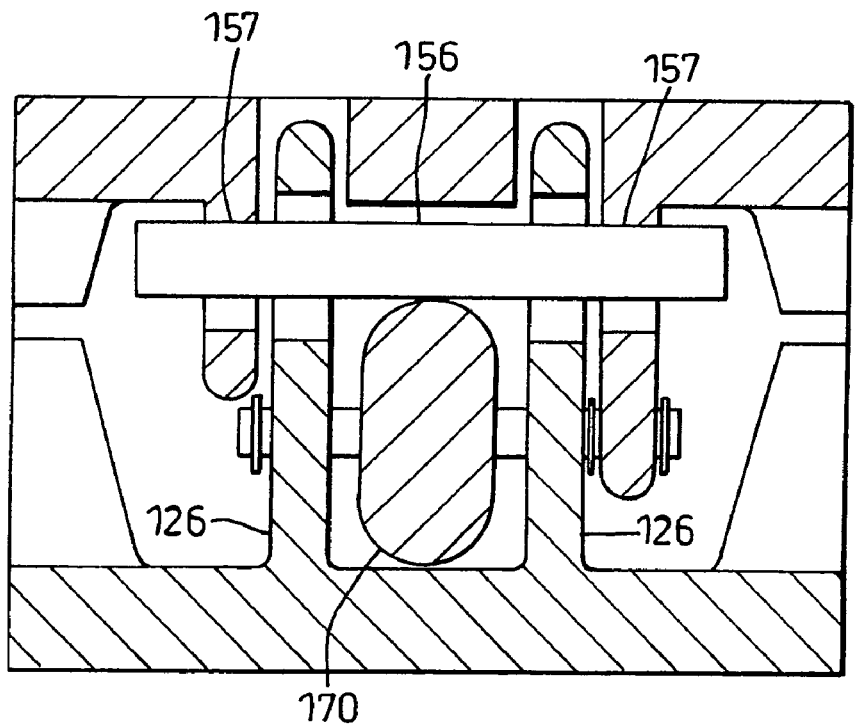
Figure 10A:
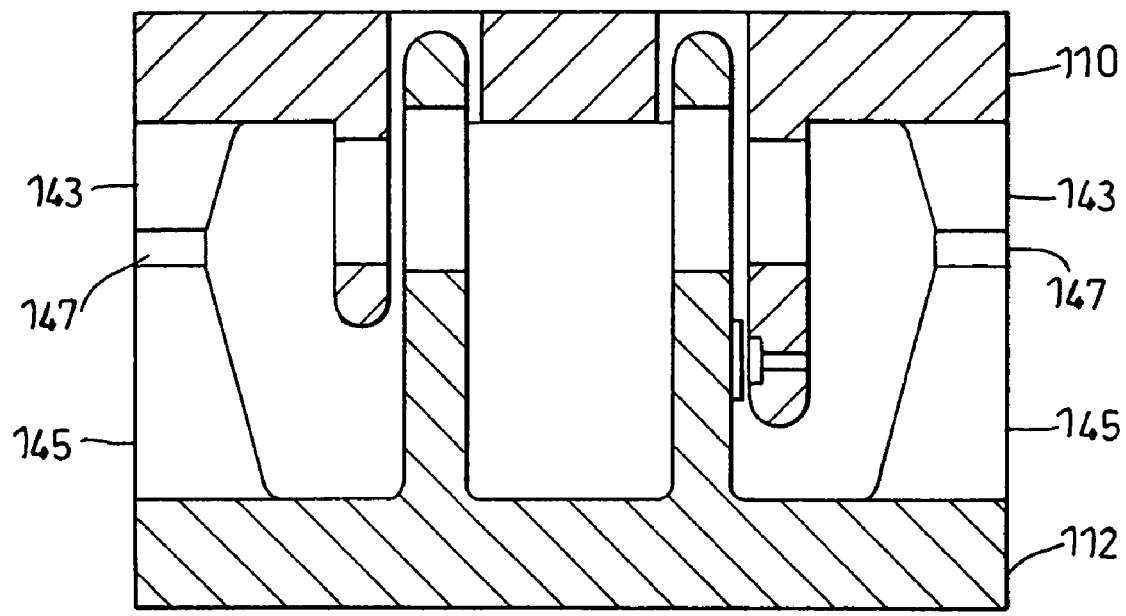
Figure 10B:
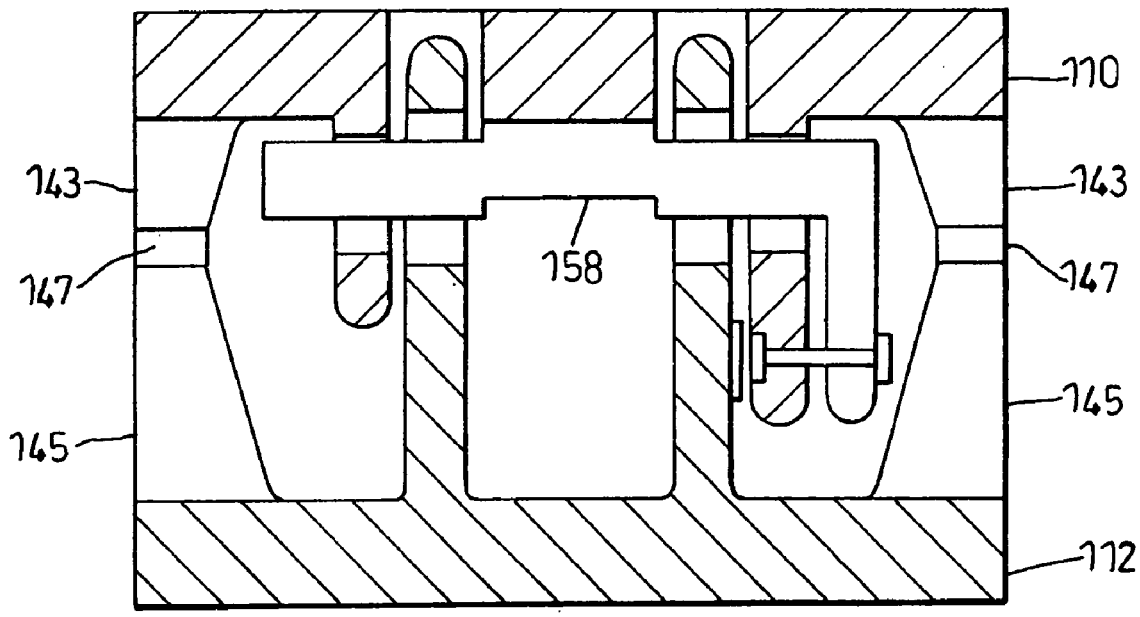

FIG. 5. shows an assembly in the transit position;

FIG. 6 shows an assembly fitted with a load cell assembly in the non-working position;

FIG. 7 shows an assembly in the working position;

FIG. 8 shows a cross-section viewed from the front of an assembly according to a second embodiment of the invention, in an operative position;

FIG. 9 shows the assembly of FIG. 8 in a raised position;

FIGS. 10a and 10b shows the assembly of FIG. 8 in an inoperative position, without and with the upper engagement means reinstalled, respectively;

FIG. 11 shows a side view of the upper part of the assembly of FIG. 8; and

FIG. 12 shows a side view of the lower part of the assembly of FIG. 8.

A loading assembly according to a first embodiment of the present invention and as depicted in FIG. 1 to 7 of the accompanying drawings comprises two parts: an upper part comprising an outer body 10 and a lower part comprising an inner body 12. Each of these comprises means to keep captive a nut such that by introduction of a threaded rod (not shown) or similar the respective part may be introduced into the load path.

The outer body 10 is of the form of a generally planar frame surrounding an interior 30. It is to be mounted vertically and is elongate in a vertical direction. It comprises, at its top end, a suspension hole 14 in which nut 16 is held captive by circlip 18 held in circumferential groove 20. Accordingly, a rod may be introduced from above the outer body such that the outer body 10 and hence the assembly may be suspended from an anchor point. Depending from the top of the interior 30 of the outer body 10 are two parallel vertical forks 34, hereinafter referred to as the "upper" forks 34. Each fork has an elongate hole 52 formed through it.

An opening 22 at the bottom of the outer body 10 allows connection of a load to the inner body, which is contained within the interior 30 of the outer body 10. The walls of the outer body 10 surrounding the lower opening 22 define a section of the surface of a sphere, with a centre point 36 between the two forks 34. As will be described hereinbelow, this enables a load to swing about the centre point 36 as is likely will happen with a suspended load.

The inner body 12 is of the form of a horizontal bridge portion 24 with two parallel spaced apart forks 26. These forks shall hereinafter be referred to as the "lower" forks 26. The inner body 12 has in the bridge portion 24 a nut 28 again held captive by a circlip 30 in circumferential groove 32. In this case, a rod may be introduced below such that a load may be suspended from the inner body. The lower forks 26 each have a hole 40 passing through them.

When the assembly is supplied to a user, it is in the transit position depicted in FIG. 5. Inner body 12 is held secure to outer body 10 by means of a lower engagement member of the form of a lower shaft passing through one of the fork holes 40 and a lower transit hole 42 in the outer body. Washers and split pins (depicted as 46) hold the lower shaft in place.

An upper engagement member of the form of a cranked upper shaft 58 is also provided. The upper shaft 58 has a first arm 54, which rests in first 48 and second 50 upper shaft holes on opposite sides of the walls of the upper body. The upper shaft 58 also rests in the elongate holes 52 in the upper forks 34. Accordingly, it is necessary that these holes lie along a common, and in this case horizontal, axis. The first arm 54 of the upper shaft has a cranked portion 56, which in use and in this transit position, sits between the upper forks and is displaced vertically upwards with respect to the axis of the first arm 54. The second upper shaft hole 50 and the elongate holes 52 in the upper forks 34 are necessarily elongate due to the necessity to allow insertion of the upper shaft 58 and more particularly the cranked portion 56 through the second upper shaft hole 50.

The end of the first arm 54 that passes through first hole 48 is secured by means of split pin and washer 62. The cranked upper shaft 58 has a second arm 60, which extends perpendicularly from the end of the first arm normally adjacent to the second upper shaft hole 50. In the transit position, this second arm 60 is secured to the upper body by means of a screw 64 passing through second arm hole 66 and into captive nut 68 retained within outer body 10. The captive nut 68 is positioned so that, in the transit position, the second arm 60 is generally vertical.

Figure 1B:
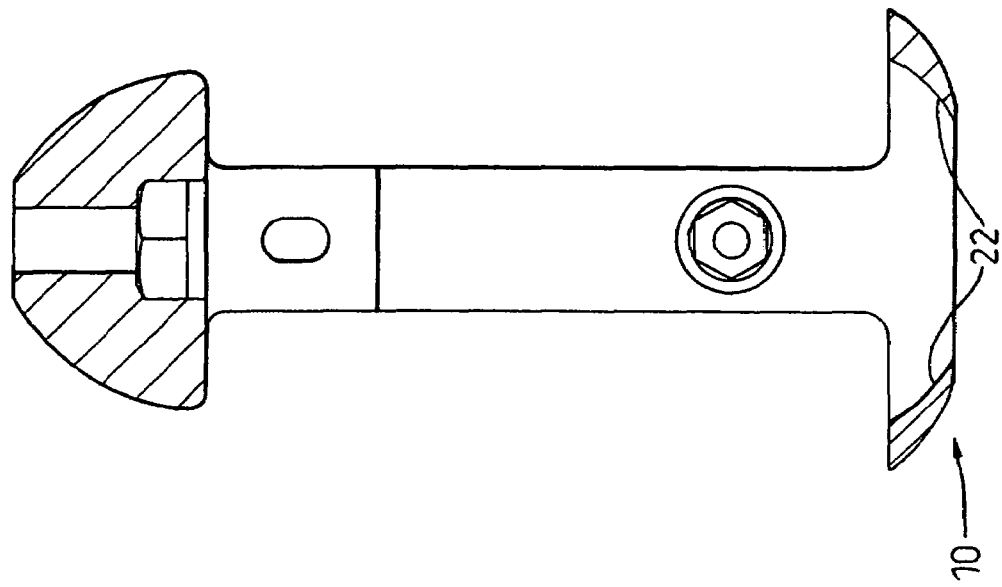
FIGS. 1a and 1b show the outer body of an assembly according to a first embodiment of the invention, in front and side central cross section, respectively.
Figure 1A:
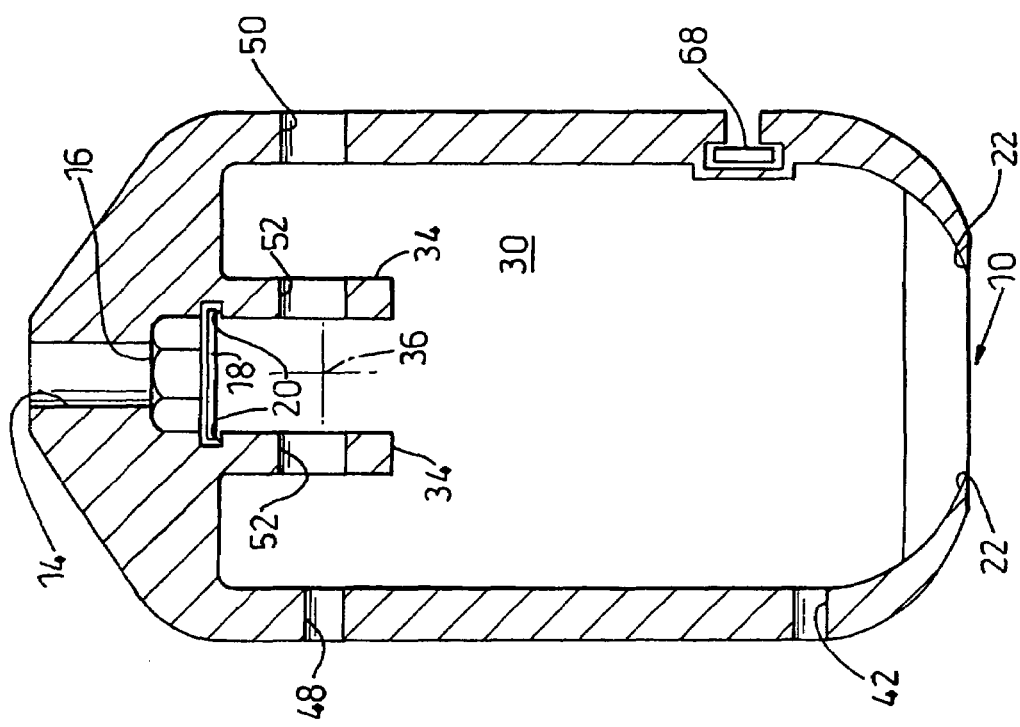
Figure 2A:
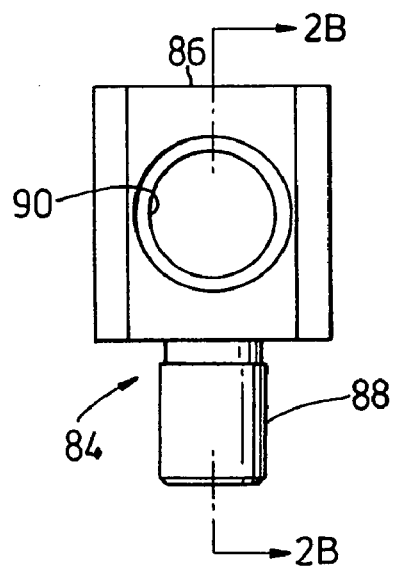
FIG. 2a shows one of the loading adaptors used in the invention in front plan view.
Figure 2B:
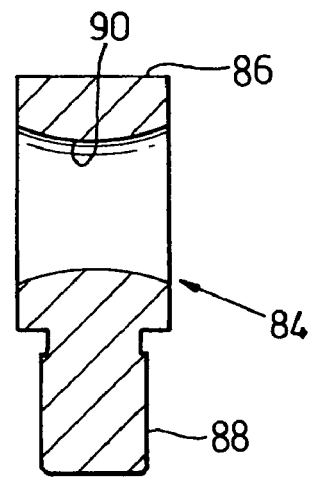
FIG. 2b shows the loading adaptor of FIG. 2a in cross section along line 2B.
Figure 3:
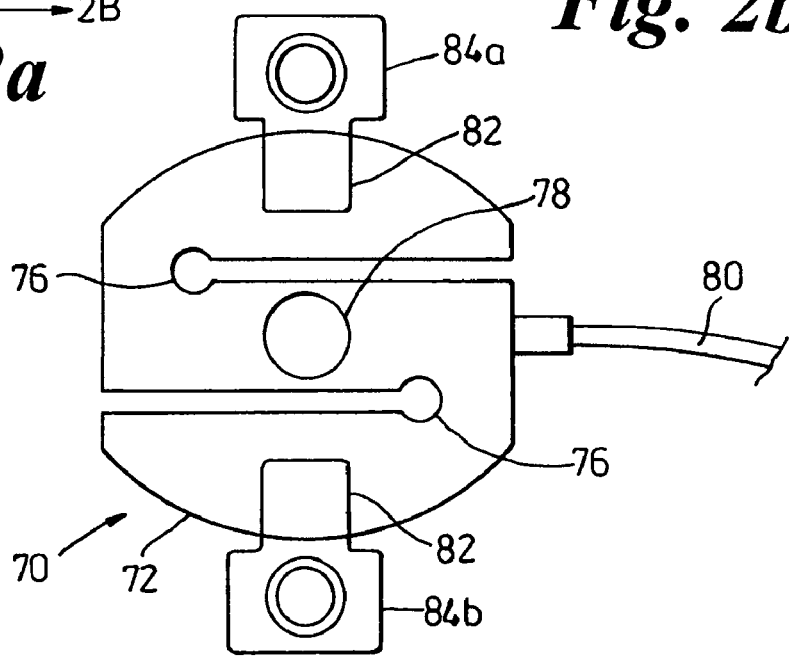
FIG. 3 shows the load cell assembly of the assembly of FIG. 1.
Figure 4A:
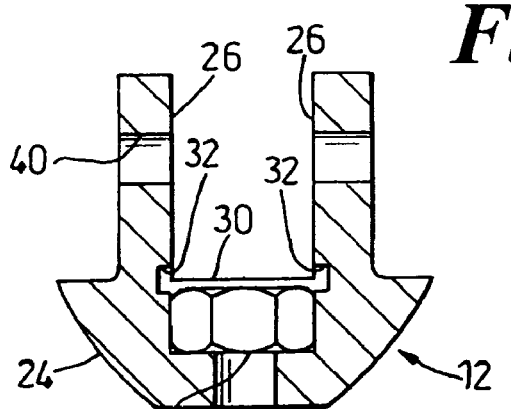
FIGS. 4a and 4b show front and side cross sections, respectively, through the inner body of the assembly of FIG. 1.
Figure 4B:
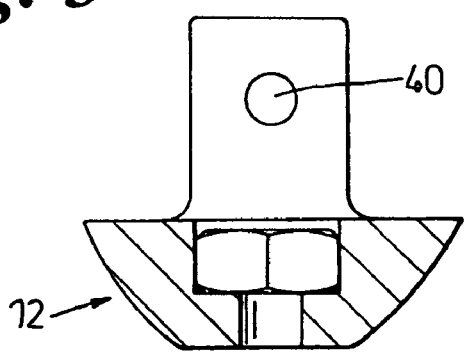

A user is also separately supplied with a load cell assembly 70 as shown in FIG. 3, The load assembly comprises an S-beam load cell 72 as are well know in the art. The load cell 72 is of the form of an S-shaped beam, with recesses 76 in the crooks of the S. A thinned out section 78 is provided in the centre of the S, in which the thickness in the plane of the S is greatly reduced. On this thinned out section strain gauges are mounted, electrically connected to form a bridge. The thinned out section 78 is then welded over to provide the strain gauges with protection from the elements. Electrical connections to the strain gauges are provided by means of a cable 80. This type of load cell 72 is well known in the art and is used due to its reliability and predictability.

Recesses 82 are provided in the top and bottom of the S of the load cell into which loading adaptors 84a, 84b are inserted to form the assembly. The loading adaptors (depicted as 84 in FIGS. 2a and 2b) each comprise a body section 86 having aperture 90. The aperture 90 has curved walls, which means the adaptor 84 is allowed to rock about a shaft introduced into the aperture 90 about all three axes. The adapter 84 also has a plug 88 depending from it, whereby it is mated to load cell 72.

The user wishing to install the load cell invention of this embodiment installs the assembly in the load path in the above described transit position by screwing threaded rods, connected to an anchor point and to the load to be suspended, into the captive nuts 16, 28 in the upper 10 and lower 12 bodies respectively. The user then removes upper 58 and lower 44 shafts, and offers the top loading adaptor 84a of the load cell assembly 70 up to the upper forks 34. Upper shaft 58 is replaced in the upper body 10 in the position shown in FIG. 6. In this "inoperative" position, the upper shaft is replaced in the upper body rotated by 180 degrees about the axis of the first arm 54 relative to the transit position.

Accordingly, the cranked portion 56 now lies vertically below the axis of the first arm 54, and engages the recess 90 of the upper loading adaptor 84a. The inner body 12 is then attached to the lower loading adaptor 84b by means of lower shaft 44 passing through lower forks 26 and recess 90 of lower load adapter 84b. At this point, the load cell 72 is not under load as the lower body 12 is resting on the lower interior surface of the outer body. The assembly is now in the position shown in FIG. 6.

In order to transfer the load onto the load cell 72 the second arm 60 of the upper shaft 58 is rotated about the first arm 54 such that it is back in the original transit position. This forces the cranked portion 56 to rise, taking the load cell assembly 70 and inner body 12 with it. Accordingly, in the "operative" position shown in FIG. 7, the load now acts through the load cell 72 and hence measurement of the load acting on the assembly is possible. Screw 64, which previously held the second arm 60 fixed relative to the upper body 10 in the transit position, is again used to secure the second arm 60 to the upper body 10 such that the upper shaft 58 does not move unexpectedly in use of the load assembly. The load, and hence the load cell assembly, is able to swing a certain amount in each direction due to the spherical walls surrounding the lower orifice 22 in the upper body.

Once the load assembly has been installed, it may be necessary to remove the load cell assembly 70, for example for maintenance of the load cell 72 or if the load cell 72 fails. In such a case, the screw 64 is remove and the second arm 60 rotated through 180 degrees to the non-working position depicted in FIG. 6. As inner body 12 now rests on outer body 10, the load acts through the two bodies 10, 12 and not through the load cell assembly 70. Load cell assembly 70 accordingly can be removed and replaced as necessary and then the second arm 60 rotated back 180 degrees to the working position and secured with screw 64.

Similarly, in the unfortunate case where the load cell assembly 70 separates (for example, if the load cell 72 breaks) in some way, the inner body 12 will no longer be held by the load cell assembly 70 and will fail until it hits the outer body 10. Hence, the load will simply be transferred from being held by the load cell assembly 70 being supported by the outer body 10. This removes the need for a separate safety strap.

A second embodiment of the invention is depicted in FIGS. 8 to 13 of the accompanying drawings. Similar features to those of the first embodiment have been given the same reference indices raised by 100. The load cell assembly shown is used in compression, with the assembly supporting a load above a surface such as a floor.

The assembly comprises a lower part 112, securable to a floor, and an upper part 110 to which a load can be secured. Both parts have a body section of the form of a plate, which can be fixed to the load or the floor as appropriate.

Two sets of forks 126 depend upwards from lower portion 112 and each carry a shaft 140 between the forks of each set. These shafts 140 engage and support either and of a shear beam load cell 170. This is of the form of a bar mounted at either end, with two thinned out portions 178 between the mounting points. Strain gauges (not shown) are mounted on these thinned out sections 178. Electrical connection is made to these strain gauges is made by cable 180 to the appropriate measurement apparatus. A groove 171 is provided at the middle of the top surface of the load cell 170 on which the load is applied as described below.

The upper part 110 also has a set of forks 111 depending from its body section. Each fork is provided with an aperture 113 through which a cranked shaft 154 may be introduced as described below. The apertures 113 are spaced slightly from the body section such that the top of the aperture is lower than the bottom of the plate of the body section.

The upper part 110 is mounted on the load cell by means of upper engagement member 158. This is of the form of a horizontal cranked shaft 154 having a handle portion 160 in a similar manner to the first embodiment. In normal use (FIG. 8 of the accompanying drawings), the load cell engages the upper engagement member 158 at a central cranked portion 156 of the cranked bar 154. This central cranked portion 156 also engages the body section of the upper part 110. The outer, uncranked, portions 157 further engage the upper part 110 at the top of each aperture 113. Any load applied to the upper part 110, for example by placing a vessel on top of the upper part 110, will therefore pass through the upper part, the upper engagement member 158, the load cell 170 and finally the lower part 112.

The upper engagement mean further comprises a handle 160, which can be secured to the upper part 110 by means of a bolt 164 and a captive nut 168 in the same manner as in the first embodiment.

In order to remove the load cell 170, it is desirable to otherwise support the upper part 110 and hence any load. This can be achieved as follows. Rotation of the upper engagement member 158 (using the handle 160 thereof in a similar manner to the first embodiment) will cause the upper engagement member to rotate about outer, uncranked, sections 157. The outer portions 157 will therefore move vertically relative to the cranked portion 156, which causes the upper part to lift relative to the load cell, and hence the lower part 112. The assembly is now in the "raised" position shown in FIG. 9 of the accompanying drawings.

Each of the upper and lower parts 110, 112 have a set of support posts 143, 145 at each corner thereof, depending from the relevant part towards a matching set of support posts 145, 143 of the other part. In normal use, (FIG. 8 of the accompanying drawings) these do not contact one another and so have no effect on he operation of the assembly. Once the assembly has been placed in the "raised" position of FIG. 9 of the accompanying drawings, sufficient space is provided between the support posts of the two parts that spacers 147 can be inserted between the support posts. The upper engagement member can then be rotated back to the operative position (FIG. 8 of the accompanying drawings) such that the lower part 112 supports the upper part 110 through the spacers 147. As no load now passes through the load cell 170, the load cell 170, the upper engagement member 158 and the lower shafts 140 may therefore safely be removed, to leave the assembly in the position of FIG. 10a of the accompanying drawings.

The upper engagement member 158 can then be reintroduced into the assembly (FIG. 10b of the accompanying drawings). This ensures that the two parts of the assembly cannot separate due to upwards forces on the upper part. This a further safety feature, as the load may be restrained from toppling etc. by the assembly.

Similarly, in the unfortunate case where the load cell assembly breaks of otherwise fails in some way, the upper body 110 will no longer be held by the load cell 170 and will fall until the upper supports 143 hit the lower supports 145. Hence, the load will simply be transferred from being held by the load cell 170 to being supported by the lower body 112 through the supports 143, 145. This removes the need for a separate safety support.

The invention claimed is:

1. An assembly for use in suspending a load from a load cell, comprising:
   an upper part adapted to be secured to an anchor point and from which said load cell may be suspended; and
   a lower part adapted to be suspended from said load cell and from which said load cell may be suspended,
   wherein, in use, said assembly may be used in at least two positions, including:
   an operative position wherein said load cell is not fitted, where said lower part and hence said load are supported on said upper part;
   and
   an inoperative position wherein said lower part and said load are supported only through said load cell and said lower part does not rest on said upper part, and
   means adapted to switch said assembly between said inoperative and and said operative positions, being lifting means adapted to lift said lower part off said upper part, wherein said lifting means comprises an upper engagement member by means of which the opper part engages said load cell, and a lower engagement member by means of which said lower part engages said load cell, and wherein said lower engagement member fixes said lower part vertically relative to said load cell, while said upper engagement member allows controlled movement of said load cell relative to said upper part.

2. The assembly of claim 1 wherein said lifting means is adapted to lift said lower part by lifting said load cell.

3. The assembly of claim 1 wherein said upper engagement member is adapted to rotate about an axis and has a portion offset from said axis.

4. The assembly of claim 3 wherein said upper engagement member is adapted to engage said load cell at said offset portion.

5. The assembly of claim 3 wherein said upper engagement member comprises a cranked shaft.

6. The assembly of claim 3, wherein said assembly is adapted to engage the load cell using said offset portion of said upper engagement member.

7. The assembly of claim 5, wherein said upper engagement member further comprises a handle, by means of which rotation of said shaft is facilitated, and which is securable to said upper part such that, in use, said upper engagement member cannot rotate.

8. The assembly of claim 1 wherein said assembly is adapted to be positionable in a further, "transit", position wherein said lower part is secured to said upper part.

9. The assembly of claim 8 wherein, in said operative position, a further shaft secures said lower part to said load cell and, in said transit position, said further shaft secures said upper part to said lower part.

10. The assembly of claim 1 wherein said upper part is of the form of a frame surrounding an interior space, with an orifice providing communication between said interior and exterior spaces, wherein said lower part, in said inoperative position, rests on inner walls of said upper part in a region of the orifice.

11. The assembly of claim 10 wherein said assembly is arranged so that said lower part cannot fall through said orifice.

12. A combination of an assembly for use in suspending a load from a load cell according to claim 1 and a load cell, and wherein said combination further comprises an upper engagement member, by means of which said upper part is adapted to engage said load cell and allow controlled movement of said load cell between said operative and inoperative positions, and a lower engagement member by means of which said lower part is adapted to engage said load cell and fix said lower part vertically relative to said load cell.

13. The combination of claim 12 wherein said load cell is an S-beam load cell.

14. The combination of claim 12 wherein said load cell is adapted to pivot about a connection thereof to said upper part, being a portion of said upper engagement member offset from an axis of said upper engagement member.

15. The combination of claim 12 wherein said lower part rests on a surface of said upper part in said inoperative position, which substantially defines a section of a surface of a sphere with a centre at a point about which said load cell is pivotable.

16. A method of measuring the force due to a load, comprising the steps of:
   a) suspending said load from an assembly;
   b) fitting said assembly with a load cell; and
   c) causing said assembly to transfer said load such that it is being supported by said load cell by lifting a body associated with said load cell at least partially off a rest, and
   d) lowering said body back onto said rest such that said load cell may be removed.

17. The method of claim 16 wherein said lifting of said body is achieved by means of rotation of a cranked shaft.

18. An assembly for use in supporting loads on a load cell, comprising:
   a lower part adapted to support a load cells, and
   an upper part adapted to be supported by said load cell and on which a load can be supported,
   wherein, in use, said assembly may be used in at least two positions, including:
   an inoperative position wherein said load cell is not fitted, where said upper part, and hence said load, is supported on said lower part; and an operative position wherein said upper part and said load are supported only through said load cell and said upper part does not rest on said lower part, and wherein said assembly includes lifting means comprising an upper engagement member, by means of which said upper part is adapted engage said load cell and which allows controlled movement of said upper part relative to said load cell, said movement being controlled by said upper engagement member is at least partially vertical, and wherin said upper engagement member is to raise said upper part relative to said load cell from said operative position to a raised position, and fixing means, which are adapted to fix said upper and lower parts together and hence support said upper part on said lower part, said fixing means being adapted to be introduced in said raised position of said upper part, upon which said upper engagement member lowers said upper part onto said fixing means.

19. The assembly of claim 18 wherein said upper engagement member is adapted to rotate about an axis and has at least one portion offset from this axis, wherein said upper engagement member is adapted to engage said load cell at a portion offset from said axis of rotation.

20. The assembly of claim 19 wherein said upper engagement member engages said upper part such that rotation of said upper engagement member about said axis of rotation causes said upper part to move relative to said load cell.

21. An assembly for use in the supporting loads on a load cell, comprising:

a load cell;

a lower part adapted to support a load cell; and an upper part adapted to be supported by said load cell and on which a load can be supported, wherein, in use, said assembly may be used on at least two positions, including:

an inoperative position wherein said load cell is not fitted, where said upper part, and hence said load, is supported on said lower part; and an operative position wherein said upper part and said load are supported only through said load cell and said upper part does not rest on said lower part, and wherein said assembly includes lifting means comprising an upper engagement member, by means of which said upper part is adapted engage said load cell and which allows controlled movement of said upper part relative to said load cell, said movement being controlled by said upper engagement member is at least partially vertical, and wherein said upper engagement member is to raise said upper part relative to said load cell from said operative position to a raised position, and fixing means, which are adapted to fix said upper and lower parts together and hence support said upper part on said lower part, said fixing means being adapted to be introduced in said raised position of said upper part, upon which said upper engagement member lowers said upper part onto said fixing means.

22. The combination of claim 21 wherein said load cell is a shear beam load cell.

23. The combination of claim 21 wherein said load cell engages said upper engagement member about a groove in said load cell.

* * * * *